(12) United States Patent
Cho

(10) Patent No.: US 11,038,958 B2
(45) Date of Patent: Jun. 15, 2021

(54) METHOD AND APPARATUS FOR PROVING DATA DELIVERY IN UNTRUSTED NETWORK

(71) Applicant: NETWORK DEFINES INC., Gyeonggi-do (KR)

(72) Inventor: Kideok Cho, YongIn Gyeonggi-do (KR)

(73) Assignee: NETWORK DEFINES INC., Gyeonggi-Do (KR)

(*) Notice: Subject to any disclaimer, the term of this patent is extended or adjusted under 35 U.S.C. 154(b) by 0 days.

(21) Appl. No.: 17/104,619

(22) Filed: Nov. 25, 2020

(65) Prior Publication Data

US 2021/0084101 A1    Mar. 18, 2021

Related U.S. Application Data

(63) Continuation of application No. PCT/KR2019/006835, filed on Jun. 5, 2019.

(30) Foreign Application Priority Data

Jun. 5, 2018  (KR) ........................ 10-2018-0064623

(51) Int. Cl.
   *G06F 15/173*  (2006.01)
   *H04L 29/08*   (2006.01)

(52) U.S. Cl.
   CPC ................................. *H04L 67/108* (2013.01)

(58) Field of Classification Search
   CPC ............... H04L 67/108; H04L 49/3072; H04L 12/1475; H04L 12/1478; H04L 29/08378; H04L 29/08477

USPC ................................................... 709/238, 241
See application file for complete search history.

(56) References Cited

U.S. PATENT DOCUMENTS

| | | | |
|---|---|---|---|
| 6,529,932 B1 | 3/2003 | Dadiomov et al. | |
| 10,771,524 B1* | 9/2020 | Long | H04L 29/08306 |
| 2002/0184224 A1* | 12/2002 | Haff | H04L 63/08 |
| 2005/0042983 A1* | 2/2005 | Borgward | G06Q 30/04 |
| | | | 455/3.06 |
| 2006/0100895 A1* | 5/2006 | Krusche | G06Q 30/00 |
| | | | 705/53 |
| 2008/0304491 A1 | 12/2008 | Scott et al. | |
| 2009/0138307 A1* | 5/2009 | Belcsak | G06Q 40/06 |
| | | | 705/36 R |

(Continued)

FOREIGN PATENT DOCUMENTS

JP    2005159646 A    6/2005
KR    101252947 B1    4/2013

OTHER PUBLICATIONS

International Search Report of PCT/KR2019/006835 dated Sep. 25, 2019.

(Continued)

*Primary Examiner* — Thu Ha T Nguyen
(74) *Attorney, Agent, or Firm* — Dinsmore & Shohl LLP; Yongsok Choi, Esq.

(57) ABSTRACT

Provided is a method for transmitting content in a peer-to-peer (P2P) network. The method includes receiving a delivery request of a k-th chunk of the content from a requesting terminal; calculating a delivery probability for delivering the k-th chunk of the content to the requesting terminal; and delivering the k-th chunk of the content to the requesting terminal with the delivery probability.

3 Claims, 5 Drawing Sheets

(56) References Cited

U.S. PATENT DOCUMENTS

| | | | |
|---|---|---|---|
| 2010/0058405 A1* | 3/2010 | Ramakrishnan | H04N 7/17318 725/97 |
| 2010/0146569 A1* | 6/2010 | Janardhan | H04N 7/17318 725/98 |
| 2010/0293097 A1* | 11/2010 | Pomeroy | H04L 67/104 705/58 |
| 2011/0015968 A1* | 1/2011 | Carlson | G06Q 50/184 705/310 |
| 2011/0131278 A1* | 6/2011 | Nieh | H04L 67/108 709/204 |
| 2013/0246233 A1* | 9/2013 | Hakim | G06Q 40/10 705/30 |
| 2014/0164515 A1* | 6/2014 | Maltbie | H04L 67/104 709/204 |
| 2014/0237614 A1* | 8/2014 | Irvine | H04L 9/3247 726/26 |
| 2015/0006895 A1* | 1/2015 | Irvine | H04L 9/3242 713/171 |
| 2015/0067819 A1* | 3/2015 | Shribman | H04L 67/2838 726/12 |
| 2015/0180971 A1* | 6/2015 | Varney | G06F 15/173 709/204 |
| 2016/0253710 A1* | 9/2016 | Publicover | H04N 21/4532 705/14.66 |
| 2016/0366250 A1* | 12/2016 | Lee | H04L 67/306 |
| 2017/0132625 A1 | 5/2017 | Kennedy | |
| 2018/0025442 A1* | 1/2018 | Isaacson | G06F 3/048 705/26.62 |
| 2018/0117446 A1* | 5/2018 | Tran | A42B 3/0433 |
| 2019/0057115 A1* | 2/2019 | Liu | H04L 9/3263 |
| 2019/0082007 A1* | 3/2019 | Klarman | H04L 9/3239 |
| 2019/0147532 A1* | 5/2019 | Singh | G06Q 40/04 705/35 |
| 2019/0171438 A1* | 6/2019 | Franchitti | G06F 16/9538 |
| 2019/0182257 A1* | 6/2019 | Lee | G06Q 10/06315 |
| 2019/0215149 A1* | 7/2019 | Ramasamy | H04L 67/1012 |
| 2019/0251552 A1* | 8/2019 | Kurian | H04L 63/0861 |
| 2019/0296915 A1* | 9/2019 | Lancashire | G06Q 20/3825 |
| 2019/0333030 A1* | 10/2019 | Ramasamy | H04L 9/3239 |
| 2019/0356641 A1* | 11/2019 | Isaacson | G06Q 20/384 |
| 2020/0026785 A1* | 1/2020 | Patangia | H04L 63/123 |
| 2020/0074552 A1* | 3/2020 | Shier | G06Q 20/10 |
| 2020/0090090 A1* | 3/2020 | Padmanabhan | G06F 21/6218 |
| 2020/0167770 A1* | 5/2020 | Kurian | G06Q 20/065 |
| 2020/0272619 A1* | 8/2020 | Alferov | G06Q 50/265 |
| 2020/0272978 A1* | 8/2020 | Flores | G06Q 10/06316 |
| 2020/0311734 A1* | 10/2020 | Mardikar | H04L 9/3239 |
| 2020/0313884 A1* | 10/2020 | Trevethan | G06Q 10/10 |
| 2020/0328889 A1* | 10/2020 | Matetic | H04L 9/3236 |
| 2020/0342014 A1* | 10/2020 | Kumar | G06F 16/3334 |
| 2020/0366495 A1* | 11/2020 | Mahoney | H04L 9/12 |
| 2020/0374300 A1* | 11/2020 | Manevich | H04L 9/3265 |
| 2020/0374301 A1* | 11/2020 | Manevich | H04L 9/3239 |
| 2021/0035098 A1* | 2/2021 | Long | H04L 9/0643 |
| 2021/0075623 A1* | 3/2021 | Petersen | H04L 9/0618 |
| 2021/0091926 A1* | 3/2021 | Ramaswamy | H04L 9/3236 |
| 2021/0105142 A1* | 4/2021 | Lee | H04L 9/0825 |
| 2021/0110310 A1* | 4/2021 | Guim Bernat | G06N 20/00 |

OTHER PUBLICATIONS

Written Opinion of the International Searching Authority for PCT/KR2019/006835 dated Sep. 25, 2019.

\* cited by examiner

METHOD AND APPARATUS FOR PROVING DATA DELIVERY IN UNTRUSTED NETWORK

CROSS-REFERENCE TO RELATED APPLICATIONS

This application is a continuation application of PCT/KR2019/006835 filed on Jun. 5, 2019 which claims priority under 35 U.S.C. § 119 to Korean Patent Application No. 10-2018-0064623 filed on Jun. 5, 2018, the entire contents of which are herein incorporated by reference.

BACKGROUND

1. Field

Exemplary embodiments of the present disclosure relates to a method and apparatus for providing network services, and more particularly, to a method and apparatus for proving efficient data delivery in a network.

2. Description of the Related Art

With the advances of personal computing devices and networking technologies, many proposals have been made to build blockchain-based peer-to-peer (P2P) networks by utilizing peers' resources (e.g., CPU, storage, bandwidth). In a blockchain-based P2P delivery network, it is important to incentivize uploaders (or senders) since each peer's participation in content deliveries is essential to maintain the delivery network. However, in a trustless network without any trusted third party, it may be hard to explicitly measure and track the amount of data a peer has uploaded to the network. It is argued that it is impossible for two parties to fairly exchange a service (e.g., file delivery) and its reward without a trusted party.

Many blockchain-based projects on content delivery or storage address this fundamental issue by leveraging so-called micropayment. Under the micropayment strategy, a sender splits its content into multiple chunks and delivers individual chunks as long as a receiver provides rewards to the sender. If the receiver stops providing the rewards, the sender simply stops its delivery. For example, see the below statements in the blockchain literature.

However, the micropayment may not be sufficient to compensate the bandwidth contributions, in an effective and secure manner. Let us take an example in the micropayment scheme. After sending a chunk to a receiver, the sender halts the delivery and waits for the reward. Since the sender cannot fully utilize its uplink bandwidth due to the micropayment procedure, this repetitive send-and-halt process significantly degrades the delivery performance of a network. Moreover, a sender is prone to a fraudulent receiver (say, a fraud), who refuses to reward the sender. In such cases, there is no punishment to the fraud and no reward for the sender. In order to make a sender's loss arbitrarily small, if each micropayment is made extremely small, then the delivery performance will be too poor.

SUMMARY

The inventor of the present invention has created methods for a proof of delivery mechanism (PoD) to solve the problem of the micropayment technique. In one aspect, one embodiment of the present invention, through Proof of Delivery (PoD), a sender's delivery can be authenticated and verified through other peers without the need for a trusted third party. Also, fraud can be detected and blocked in the network. For example, fraudulent peers can no longer effectively download content. Moreover, through a trust window mechanism, it is possible to provide improved performance by adjusting the amount of micropayments to trusted recipients. Exemplary embodiments of the present disclosure provide a method performed in a transmitting terminal for delivering content in a peer-to-peer (P2P) network. The method includes receiving, by the transmitting terminal, a delivery request of a k-th chunk of the content from a requesting terminal; in response to receiving the delivery request, calculating a delivery probability of delivering the k-th chunk of the content to the requesting terminal; and delivering the k-th chunk of the content to the requesting terminal based on the delivery probability.

Exemplary embodiments of the present disclosure provide a method performed in a transmitting terminal for delivering content in a peer-to-peer (P2P) network. The method includes receiving a delivery request of a k-th chunk of the content from a requesting terminal; in response to receiving the delivery request of the k-th chunk, calculating trustworthiness of the requesting terminal; adjusting a size (L) of a trust window for the requesting terminal in proportion to the reliability of the requesting terminal; receiving a delivery request for a k+1th chunk of the content or a delivery request for a k+L−1th chunk of the content from the requesting terminal; and in response to receiving the delivery request for the k+1th chunk of the content or the delivery request for the k+L−1th chunk of the content, delivering the k+1-th chunk of the content or delivering the k+L−1th chunk of the content to the requesting terminal, wherein L is a positive number.

According to one aspect of the present disclosure, the calculating the trustworthiness of the requesting terminal includes calculating the size of the trust window of the requesting terminal, wherein the size of the trust window of the requesting terminal is increasing proportionally to the value that is the number of chunks received by the requesting terminal minus the number of the chunks for which the requesting terminal has not paid.

According to one aspect of the present disclosure, the calculating the delivery probability of delivering the k-th chunk of the content to the requesting terminal includes receiving a blockchain transaction record of a blockchain network, and calculating the delivery probability based on transaction information of the requesting terminal included in the blockchain transaction record.

According to one aspect of the present disclosure, the delivery probability of delivering the k-th chunk of the content is calculated based on a chunk request probability ($P_\alpha^{i,j}$ or $P_\alpha$) for the k-th chunk, wherein the content is composed of N+1 chunks, and wherein i is an index of a smallest chunk that has not been transmitted and rewarded for an i-th chunk, j is an index of a next chunk requested by the requesting terminal, N is a largest chunk index of the content, and a is an arbitrary value of $0<\alpha<1$.

According to one aspect of the present disclosure, the transaction information includes transmitting terminal information, receiving terminal information, transaction amount information, and transaction content information.

Exemplary embodiments of the present disclosure provide a method performed in a receiving terminal for receiving a content in a peer-to-peer (P2P) network. The method includes requesting a delivery of a k-th chunk of the content; receiving the k-th chunk of the content; generating transaction information for the k-th chunk of the content, wherein the transaction information includes transmission terminal information that has transmitted the k-th chunk, information on the receiving terminal that has received the k-th chunk, transaction amount information, and transaction content information; and transferring the transaction information to a blockchain network to record the transaction information.

According to one aspect of the present disclosure, the receiving terminal is a peer of the P2P network for content transmission that is distinct from a blockchain network.

Exemplary embodiments of the present disclosure provide non-transitory computer-readable storage medium for sharing media asynchronously. The storage medium includes program code stored thereon, that when executed a processor, causes the processor to perform the above method.

BRIEF DESCRIPTION OF THE DRAWINGS

The above and other features and advantages of the present inventive concept will become more apparent by describing in detailed exemplary embodiments thereof with reference to the accompanying drawings, in which.

Figure 1:
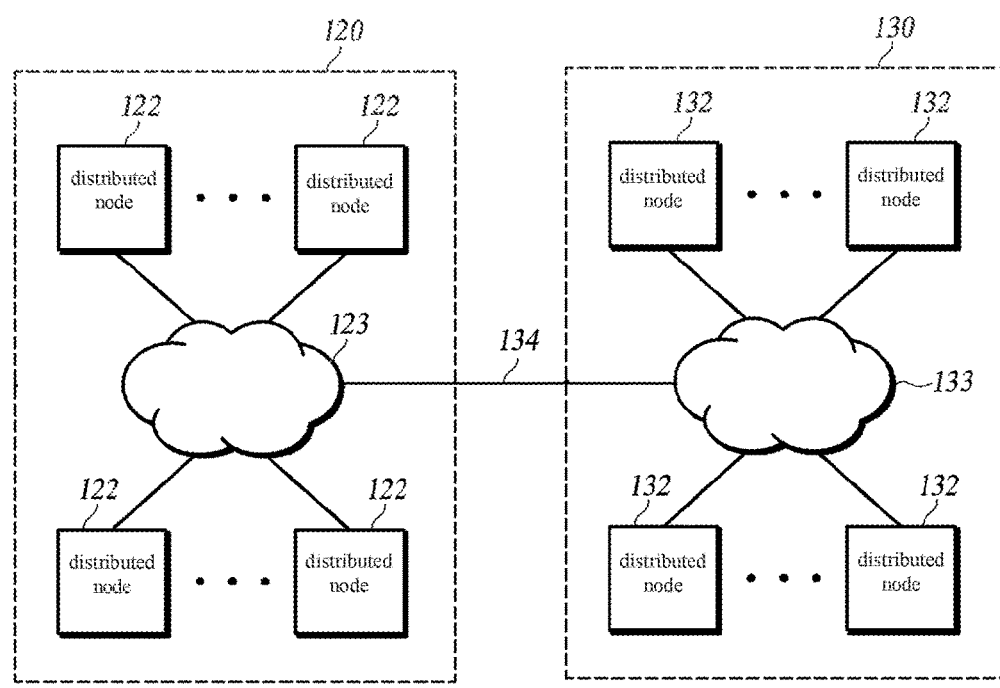
FIG. 1 is a schematic view illustrating a blockchain-based delivery management system according to an exemplary embodiment of the present disclosure.

According to this disclosure, the transmission of the sender is performed without a trusted third party. It can be authenticated and verified by other peers, and can provide improved performance by adjusting micropayments to trusted recipients.

DETAILED DESCRIPTION

The present inventive concept now will be described more fully hereinafter with reference to the accompanying drawings, in which exemplary embodiments of the present invention are shown. The present inventive concept may, however, be embodied in many different forms and should not be construed as limited to the exemplary embodiments set forth herein.

Rather, these exemplary embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the inventive concept as used herein.

Hereinafter, the present inventive concept will be explained in detail with reference to the accompanying drawings.

FIG. 1 is a schematic view illustrating a blockchain-based delivery management system according to an exemplary embodiment of the present disclosure. Referring to FIG. 1, the delivery proof management system 100 includes a P2P network system 120 and a blockchain network system 130. According to an exemplary embodiment of the present disclosure, the P2P network system 120 includes a plurality of distributed nodes 122, and a P2P communication network. According to an exemplary embodiment of the present disclosure, the blockchain network system 130 includes a plurality of distributed nodes 132 and a blockchain communication network 134. Referring to FIG. 1, the P2P network system 120 and the blockchain network system 130 are connected through the communication network 134.

According to an embodiment of the present disclosure, the P2P network system 120 may be any wired or wireless communication network system including a plurality of distributed nodes 122 connected to each other through the P2P communication network 123. According to an embodiment of the present disclosure, the P2P communication network 123 may be, for example, a P2P distributed network implemented on a TCP/IP communication network. According to an embodiment of the present disclosure, P2P communication network 123 may be, for example, a P2P network implemented in a Wi-Fi network, a LAN network, a WAN network, or an Internet network, but the present disclosure is not limited thereto. According to an embodiment of the present disclosure, the P2P network 123 may be a network (eg, an Ethereum network) in which all users can participate without limitation, but the present disclosure is not limited thereto.

According to an embodiment of the present disclosure, each distributed node 122 of the P2P network system 120 may transmit/receive content through P2P communication. Each distributed node 122 may receive a content transmission request from another distributed node 122 and transmit the content to the corresponding distributed node 122 through the communication network 134.

According to an embodiment of the present disclosure, each distributed node 122 may receive each distributed blockchain transaction from the distributed node 132 of the blockchain network 133 through the communication network 134. According to an embodiment of the present disclosure, each distributed node 122 may analyze a transaction record on a received transaction.

According to an embodiment of the present disclosure, each of the plurality of distributed nodes 122 may generate a request for recording blockchain transaction on the blockchain network system 130 according to a predetermined protocol, and may distribute to the distributed node 132 on the blockchain network system 130.

According to an embodiment of the present disclosure, the blockchain network system 130 may be any wired or wireless communication network including a plurality of distributed nodes 132 connected to each other through the communication network 134. According to an embodiment of the present disclosure, the blockchain network system 130 may include, for example, a P2P distributed network implemented on a TCP/IP communication network. According to an embodiment of the present disclosure, the blockchain network system 130 may be, for example, a P2P network system implemented in a Wi-Fi network, a LAN network, a WAN network, or an Internet network, but the present disclosure is not limited thereto. According to an embodiment of the present disclosure, the blockchain network system 130 may be a public blockchain network, that is, a blockchain network (e.g., Ethereum network, etc.) in which all users can participate without limitation, but it is not limited to this.

According to an embodiment of the present disclosure, each distributed node 132 of the blockchain network system 130 receives a blockchain transaction generated by each distributed node 132 and transmits the received blockchain transaction to other distributed nodes 132 through the communication network 134. According to an embodiment of the present disclosure, each distributed node 132 may receive and process each blockchain transaction distributed from another distributed node. According to an embodiment of the present disclosure, each distributed node 132 may execute a program code on a received transaction, wherein the program code is for a predetermined smart contract.

According to an embodiment of the present disclosure, each of the plurality of distributed nodes 132 generates (or mines) a block for recording each blockchain transaction on the blockchain network system 130 according to a predetermined algorithm, and may verify it. According to an embodiment of the present disclosure, blockchain transactions which are created during a predetermined time interval are distributed on the blockchain network system 130 through each distributed node 132 and may be stored together in a newly created block. According to an embodiment of the present disclosure, each of the distributed nodes 132 may store at least a part of a blockchain (i.e., a blockchain distributed ledger) for the blockchain network system 130 according to a predetermined algorithm.

According to an embodiment of the present disclosure, each of the plurality of distributed nodes 132 receives a request for recording a blockchain transaction from the distributed node 122 on the P2P network system 120 according to a predetermined protocol and may create an associated transaction.

Figure 2:
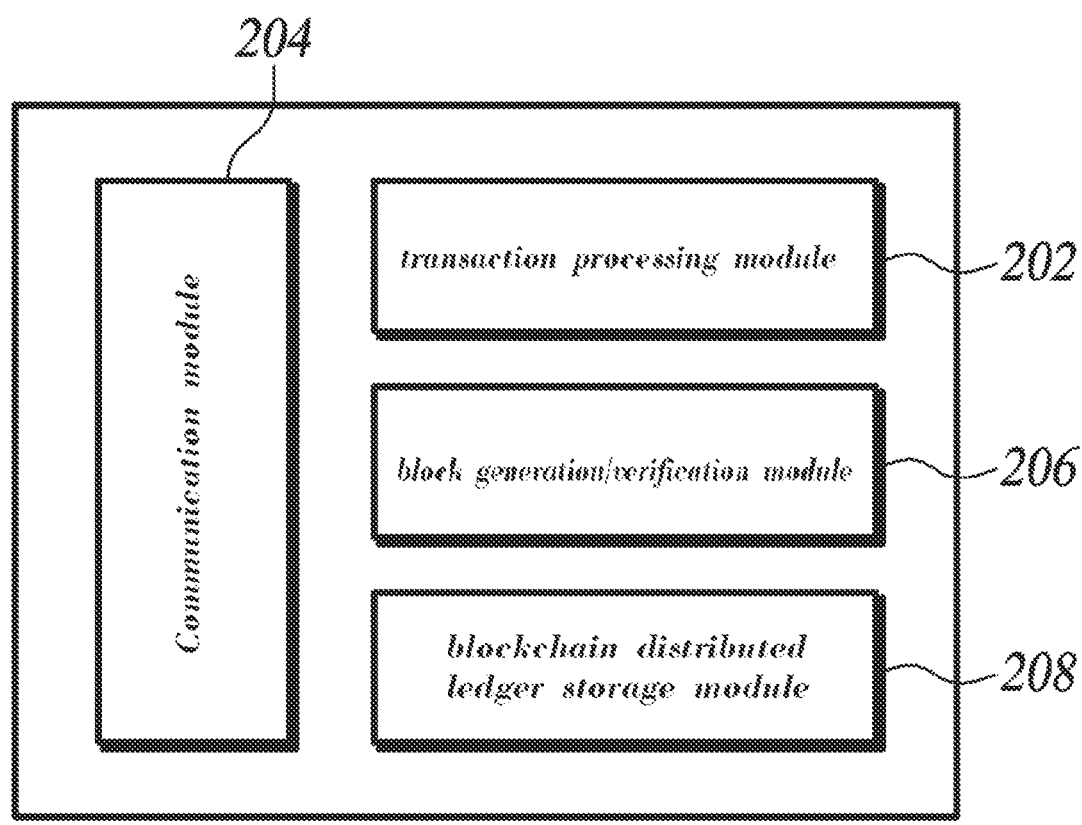
FIG. 2 is a schematic view illustrating a functional block diagram of a distributed node 120 shown in FIG. 1 according to an exemplary embodiment of the present disclosure.

FIG. 2 is a schematic view illustrating a functional block diagram of a distributed node 120 shown in FIG. 1 according to an exemplary embodiment of the present disclosure. As shown in FIG. 2, the distributed node 132 includes a transaction processing module 202, a communication module 204, a block generation/verification module 206, and a blockchain distributed ledger storage module 208.

According to an embodiment of the present disclosure, the transaction processing module 202 may receive a predetermined blockchain transaction and distribute the received transaction to other distributed nodes 132 on the blockchain network system 130. According to an embodiment of the present disclosure, the transaction processing module 202 may receive each transaction distributed by other distributed nodes 132 on the blockchain network system 130. According to an embodiment of the present disclosure, the transaction processing module 202 may process each received transaction (e.g., including execution of each smart contract included in the transaction, but the present disclosure is not limited thereto). According to an embodiment of the present disclosure, the blockchain transaction received and processed by the transaction processing module 202 may include, for example, a transaction associated with the delivery record information of the delivery transaction ledger originated from other distributed nodes 132. According to an embodiment of the present disclosure, a transaction received and processed by the transaction processing module 202 may include a various blockchain transaction which is distributed to each of the distributed nodes on the blockchain network system 130 by an arbitrary distributed node 132 and processed through the network system 130. For example, transactions may include a transaction which includes transaction information of digital currency or other smart contract information supported on the corresponding blockchain network system 130, but the present disclosure is not limited thereto.

According to an embodiment of the present disclosure, the communication module 204 may operate to enable the distributed node 132 to communicate with other distributed nodes 132 according to a predetermined protocol on the blockchain network system 130. According to an embodiment of the present disclosure, the communication module 204 may enable the blockchain transaction to be distributed on the blockchain network system 130 through the communication network 134 according to a predetermined protocol. Various types of information on the blockchain network system 130 may be received from other nodes 132 through the communication network 134.

According to an embodiment of the present disclosure, the block generation/verification module 206 generates a block for the blockchain network system 130, collects transactions that occur on the blockchain network system 130 during a predetermined time interval, and provides an appropriate header. According to an embodiment of the present disclosure, the block generation/verification module 206 may notify the generated block on the blockchain network system 130 through the communication module 204. According to an embodiment of the present disclosure, the block generation/verification module 206 may verify a block generated by another distributed node 132 and distributed on the blockchain network system 130.

According to an embodiment of the present disclosure, the blockchain distributed ledger storage module 208 may store is at least a portion of a blockchain database for the blockchain network system 130 based on a predetermined algorithm. The blockchain database may mean a distributed ledger including all the history of transactions. According to an embodiment of the present disclosure, the blockchain distributed ledger storage module 208 may include at least information on smart contracts maintained and managed by the blockchain on the blockchain network system 130 according to a predetermined algorithm, but the present disclosure is not limited thereto.

Figure 3:
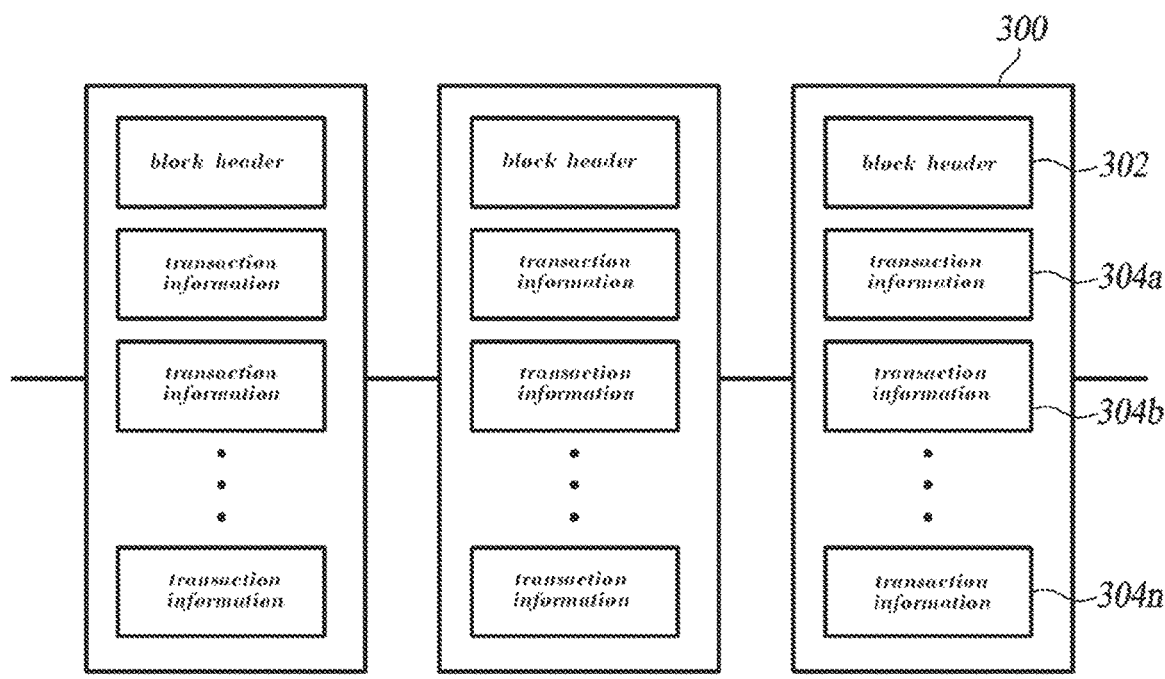
FIG. 3 is a schematic view illustrating a functional structure of a blockchain and each block included therein, which can be stored in a blockchain distributed ledger storage module included in each distributed node shown in FIG. 2 according to an exemplary embodiment of the present disclosure.

FIG. 3 is a schematic view illustrating a functional structure of a block chain and each block included therein, which can be stored in a block chain distributed ledger storage module included in each distributed node shown in FIG. 2 according to an exemplary embodiment of the present disclosure. As shown in FIG. 3, the blockchain includes a plurality of blocks, and each block 300 may include a block header 302 and a plurality of transaction information 304a-304n.

According to an embodiment of the present disclosure, the block header 302 may include a hash value of a previous block header, a nonce value, and a Merkle root of transaction information 304a-304n to be included in the corresponding block 300, a timestamp indicating the time when the block 300 was generated, and a value such as a mining difficulty level of the block 300. According to an embodiment of the present disclosure, a plurality of transaction information 304a-304n included in the block 300 may be a plurality of transaction records distributed on the blockchain network system 130 during a predetermined time interval, which are transmitted from the distributed nodes 132 of FIG. 1. According to an embodiment of the present disclosure, the transaction information 304a-304n of the block 300 may include transaction information related to each transaction record generated on the blockchain network system 130. According to an embodiment of the present disclosure, the transaction information 304a-304n of the block 300 may be a information of transaction generated by the distributed node 132 and distributed on the blockchain network system 130 through the distributed node 132.

Proof of Delivery

According to an embodiment of the present disclosure, a proof of delivery (PoD) mechanism is provided. The proof of delivery (PoD) mechanism may be based on the main pillar of a blockchain: a distributed ledger that is publicly transparent and verifiable. In one embodiment, once a sender delivers requested data to a receiver, the receiver rewards the sender by issuing a transaction record on the delivery on the blockchain. In other words, the transaction record for the exchange between the sender and the receiver may show that a delivery has been made from the sender to the receiver. According to an embodiment of the present disclosure, the proposed PoD mechanism will use transaction records not only for the proof of content deliveries, but also for fraud detection/isolation and trust window adjustment, both of which will be elaborated in the following sections, respectively.

According to an embodiment of the present disclosure, in substantiating the PoD mechanism, a content object may be divided into fixed size 'chunks' as in P2P file sharing protocols such as BitTorrent. In one embodiment, a short memo may be available in each transaction record on a blockchain.

According to an embodiment of the present disclosure, the PoD mechanism may be based on Ethereum. In one embodiment, a transaction record would look like "R pays S $0.1 for 4:K", which means that a receiver R pays a sender S $0.1 amount of reward for the delivery of chunk index 4 of content K.

Figure 4:
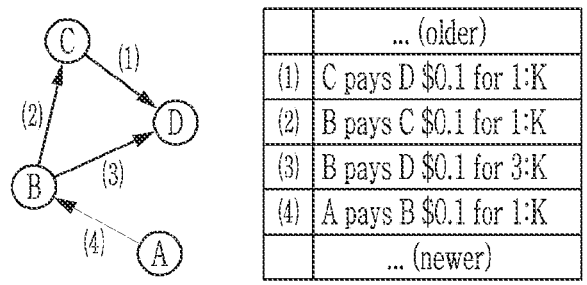
FIG. 4 is a schematic view illustrating a transaction record based on content delivery between four peers according to an exemplary embodiment of the present disclosure.

FIG. 4 is a schematic view illustrating a transaction record based on content delivery between four peers according to an exemplary embodiment of the present disclosure.

As shown in FIG. 4, each peer's past transactions are recorded in a chronological order. In one embodiment, a peer A may request peer B the first chunk of content K (1:K) and if B has the 1:K, B will send 1:K to A. After receiving 1:K from B, A should reward B for 1:K by issuing the transaction (4). Consequently, B's delivery of 1:K to A can be proved by the transaction record (4) A pays B $0.1 for 1:K.

According to an embodiment of the present disclosure, based on the transaction records on the blockchain, which is propagated throughout the network, each peer's reward history is traceable by every other peer. Therefore, a peer's chunk delivery can be proved and verified without any aid of a trusted third party. In FIG. 4, any peer can recognize that 1:K is delivered in sequence of D, C, B, and A by tracing the transaction records (1), (2), and (4).

Fraud Detection and Isolation

According to an embodiment of the present disclosure, a receiver may not pay the reward to the sender even though the sender has delivered the requested chunk. In this case, an appropriate measure should be taken to the fraud (or the receiver). The PoD may punish the fraud by isolating the fraud from the network as follows.

A. Sequential Retrieval Scenario

According to an embodiment of the present disclosure, for the sake of simplicity, peers may be set to request and retrieve chunks sequentially, which is hardly used in real systems due to its poor performance. Thus, a peer may sequentially request the next chunk only after the current chunk has been retrieved and rewarded.

Figure 5:
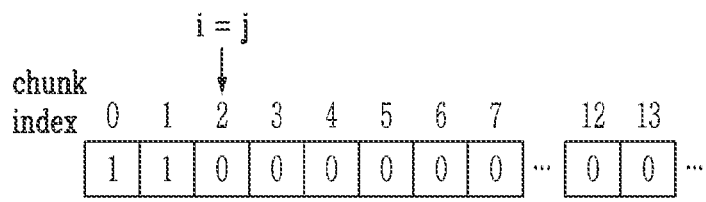
FIG. 5 is a schematic view illustrating a chunk availability of a specific content object by peer A as a bit map according to an exemplary embodiment of the present disclosure.

FIG. 5 is a schematic view illustrating a chunk availability of a specific content object by peer A as a bit map according to an exemplary embodiment of the present disclosure.

As shown in FIG. 5, peer A's current chunk availability of a content object as a bitmap '1' in the box may mean that the chunk has been retrieved and rewarded, while '0' may mean that the chunk has not been "finished" yet.

According to an embodiment of the present disclosure, the content object consists of N+1 chunks, i is the lowest chunk index that has not been finished ($0<=i<=N$), and j indicates the next chunk index that the peer will request ($i<=j<=N$), where N is the maximum chunk index of a content. In FIG. 5, i equals 2 and j equals i in this sequential retrieval scenario. In one embodiment a peer's chunk availability bitmap may be constructed by any other peer by tracing the transaction records of the peer. That is because a peer's bitmap is merely a representation of such peer's transaction records on the blockchain. Therefore, every peer can expect that peer A will request the next chunk 2 (j=2). If peer A requests a chunk other than 2, the requestee concludes that A is a fraud. Peer A should have given a reward for chunk 2 before requesting chunk 3 or higher, but the transaction records (or the constructed bitmap) do not show A's reward for chunk 2 (chunk index 2 is '0' in the bitmap).

According to an embodiment of the present disclosure, once a peer is detected as a fraud by a requestee, the peer's subsequent requests may be ignored by the requestee. The same holds for other peers in the network. Then the fraud will be isolated from the network (no more content can be retrieved) until it rewards the sender who have not received a proper reward from the fraud. Note that this fraud detection process is autonomously performed by each peer without any external information (e.g., centralized intelligence or global reputation database).

B. Probabilistic Sequential Retrieval Scenario

According to an embodiment of the present disclosure, peers may be set to the probabilistic sequential retrieval mode to improve the delivery performance. In one embodiment, a peer locally calculates its chunk request probability ($P_\alpha^{i,j}$ or $P_\alpha$ for short if it is trivial) for each chunk index and requests chunks based on the calculation. $P_\alpha^{i,j}$ can be calculated as $$P_\alpha^{i,j} = \alpha^{j-i+1} \cdot \frac{1}{\beta}$$

where $0<\alpha<1$ and $\beta$ is a normalization constant, i.e., $$\sum_{j=i}^{N} P_\alpha^{i,j} = \sum_{j=i}^{N} \alpha^{j-i+1} \cdot \frac{1}{\beta} = 1$$

where the parameters i, j, and N are defined in the above.

According to an embodiment of the present disclosure, a may be the key parameter that affects both the fraud detection ratio and the delivery performance of a peer. Each peer may vary $\alpha$ between 0 and 1 based on her preference or strategy, which will be elaborated later. For the moment, let us assume every peer equally set a to the same value.

Figure 6:
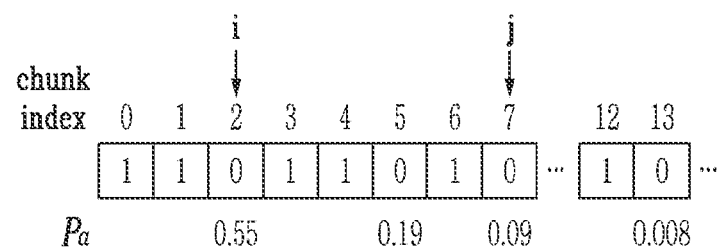
FIG. 6 is a schematic view illustrating a bitmap of peer A according to an exemplary embodiment of the present disclosure.

FIG. 6 is a schematic view illustrating a bitmap of peer A according to an exemplary embodiment of the present disclosure.

According to an exemplary embodiment of the present disclosure, as shown in FIG. 6, bitmap of peer A: 0th; 1st; 3rd; 4th; 6th, and $12^{th}$ chunks of content K have been probabilistically retrieved.

In one embodiment, a peer A's chunk availability is shown as a bitmap in FIG. 6 and $\alpha=0.7$. Since i=2, the request probability of chunk 5 (j=5) is calculated as $$P_{0.7}^{2,5} = 0.7^{5-2+1} \cdot \frac{1}{1.27} = 0.19$$

According to an embodiment of the present disclosure, the blockchain may the only reliable information provided to the peers in the network. Every peer's transaction records and current chunk availability are transparently shared through the blockchain. When a requestor (or a potential receiver) requests a chunk based on its locally calculated $P_\alpha$ a requestee (or a potential sender) can also calculate $P_\alpha$ for the incoming request. Based on $P_\alpha$ of the requested chunk, the requestee can locally make a decision whether to accept the requestor's request or not.

According to an embodiment of the present disclosure, as shown in FIG. 6, when peer A requests peer B for the 7:K, B can determine that A has requested for the 7:K with a probability of 0.09. If B is loss-averse, B might reason as follows: "If A has not received the 2:K yet, A should have requested the 2:K first, since 0.55 is quite higher than 0.09. However, A is currently requesting the 7:K, which hints that A has actually retrieved the 2:K but has not paid for it (no transaction record for the 2:K). There is something suspicious about A's request, so I will not respond to the request to avoid any potential loss."

Otherwise, if C is a risk taker, C will deliver the 7:K to A and wait for A's return. Alternatively, if A requests B for 13:K with a probability of 0.008, it is highly likely that B will deem A to be a fraud, even if B is a risk taker. That is because A should have obtained 2:K before requesting for 13-K (0:55>>0:008). The similar reasoning will hold for other peers in the network.

Consequently, if A keeps refusing its payment for 2-K, although A might have a chance to obtain a few chunks (whose indexes close to the 2-K), nobody will eventually respond to A's request(s) as the chunk index j progresses. It is inevitable for A to make its payment in order to collect all the chunks under the PoD mechanism; otherwise, it will be isolated from the network.

As mentioned before, as long as $0<\alpha<1$, a does not need to be equal throughout the network since a fraud will be eventually isolated from the network by the PoD mechanism. A loss-averse peer or a peer in a public network might set a low in order to avoid any potential loss at the cost of delivery performance degradation. That is because a peer with low a tends to (i) request chunks more sequentially and (ii) respond more conservatively than a peer with high a; lower a results in lower randomness of chunk distribution in download.

Conversely, a peer which is willing to take some occasional losses but prefers higher delivery performance will set a high. Also, high a may be used in a trusted network where the number of potential frauds is expected to be small.

Trust Window Adjustment

According to an embodiment of the present disclosure, the PoD mechanism may improve the delivery performance of a peer by analyzing the trustworthiness of the peer. As described above, the micropayment may be a repetitive send-and-halt process that significantly degrades the delivery performance. Even though a sender has many chunks to deliver, the sender has to halt the delivery until it receives a proper reward from the receiver. Since a receiver might be a fraud, the size of each delivery and payment should be kept at micro level in order to reduce any potential loss. This micro unit delivery will result in poor performance for massive volume objects.

According to an embodiment of the present disclosure, each peer's content retrieval histories may be traced on the blockchain. A peer may not have made payments in the past; i.e., the transaction record shows that the peer was a fraud. Meanwhile, another peer has paid for all the downloaded objects. By performing trust analysis, the latter peer can be recognized as a more trustful peer than the former one. In this sense, trust analysis can be autonomously performed by each peer without any external information.

Algorithm 1 Calculate Trust Window Size for $peer_i$

```
1:    TW_i: trust window size
2:    NC_i^s: number of successful object retrievals
3:    NC_i^f: number of failed object retrievals
4:    t_i: sojourn time in the network
5:    δ: trust window calculation function
6:    TW_i ← 1                         # initialize
7:    if NC_i^f > threshold then
8:        TW_i ← 1                     # a repeat fraud
9:    else
10:       TW_i ← δ(NC_i^s, NC_i^f, t_i)
11:   end if
12:   function δ(NC_i^s, NC_i^f, t_i)   # exemplary function
13:       return max(NC_i^s − NC_i^f, 1) · t_i
```

According to an embodiment of the present disclosure, the PoD (on sender's side) introduces a trust window for each receiver. Algorithm 1 presented above for an illustrative purpose shows how to calculate the trust window of a peer. The default size of the trust window equals 1, and grows in proportion to the trustworthiness of a receiver. Trust analysis, based on the transaction records on the blockchain, can be done in multiple ways reflecting a sender's preference or strategy. For example, a sender can set the trust window size proportional to the number of successful object retrievals subtracted by the number of unsuccessful object retrievals.

Trust analysis and the trust window adjustment significantly enhance the delivery performance of the micropayment algorithm. A sender no longer has to halt its delivery after sending a chunk, but rather delivers chunks simultaneously up to the size of the trust window since a trustworthy receiver is not likely to be a fraud. As a result, peers are incentivized to behave duly for better delivery performance.

Simulation Result

According to an embodiment of the present disclosure, the effect of fraud detection and isolation mechanism of the PoD may be simulated. In one embodiment, the default simulation parameters are set as follows. A network has 100 peers:99 ordinary peers and one fraud which refuses to reward a sender. Every peer tries to retrieve a content object from a server and neighboring peers, and the object is divided into 100 chunks. Each peer's $\alpha$ value is normally distributed with a mean of $\mu$ and a standard deviation of $\sigma$. If the mean is 0.8 and the standard deviation is 0.2, it is denoted as $\alpha \rightarrow 0.8$ ($\mu=0.8$, $\sigma=0.2$).

Figure 7:
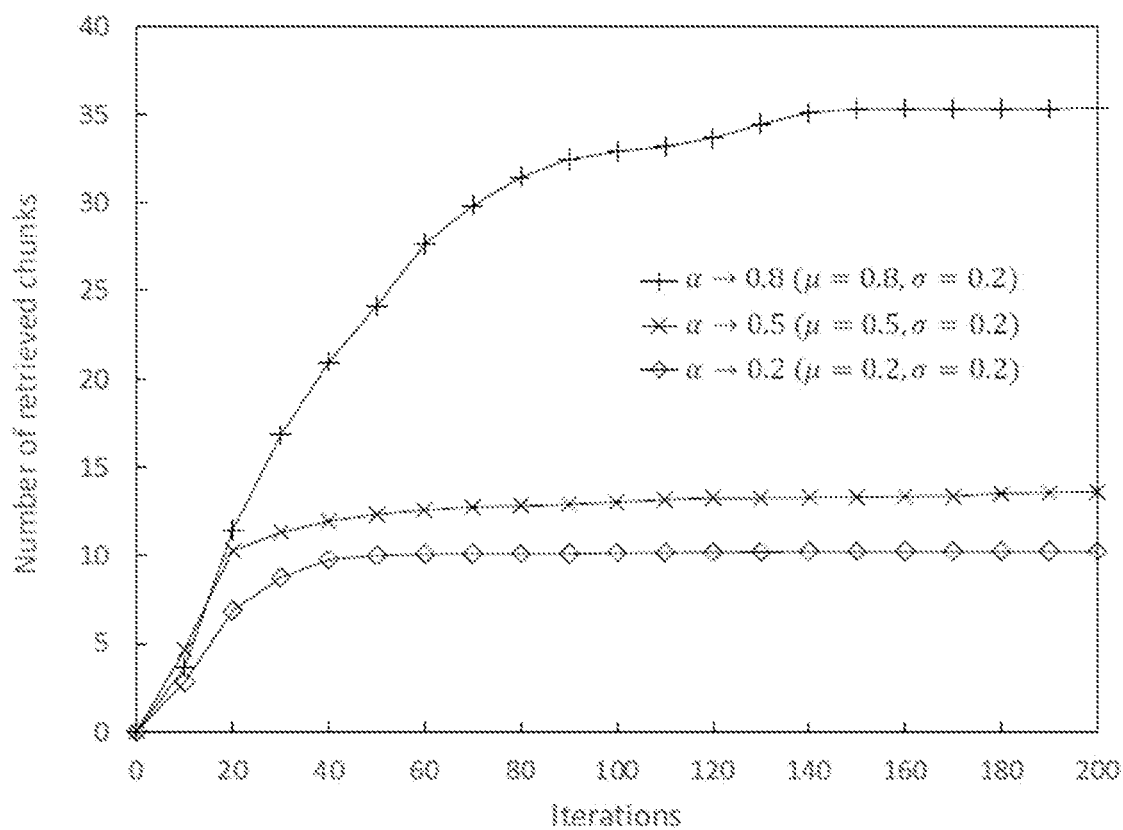
FIG. 7 is a graph illustrating an effect of detection and blocking of a fraudulent peer when a fraudulent peer refuses to pay compensation for a tenth chunk according to an exemplary embodiment of the present disclosure.

FIG. 7 is a graph illustrating an effect of detection and blocking of a fraudulent peer when a fraudulent peer refuses to pay compensation for a tenth chunk according to an exemplary embodiment of the present disclosure.

FIG. 7 shows the simulation results when a fraud refuses to pay the reward for the 10th chunk. The Y-axis is the number of chunks that the fraud has retrieved during the iterations. A network with $\alpha \rightarrow 0.2$ ($\mu=0.2$, $\sigma=0.2$) describes a trustless network, where most of the peers have strong loss-aversion. In this case, $P_\alpha$ drops sharply as the fraud requests chunks with indexes higher than 10 (j>10). As a result, her requests are ignored and she hardly retrieves any further chunks from the network. On the contrary, when $\alpha \rightarrow 0.8$ ($\mu=0.8$, $\sigma=0.2$), the fraud is able to retrieve 25 more chunks whose indexes are close to the 10th chunk. In all cases, the fraud will be eventually isolated from the network, unless she makes its payment for 10th chunk. These results show that a peer can control her degree of loss-aversion by adjusting without any degradation to the PoD operations.

According to an embodiment of the present disclosure, the novel proof of delivery (PoD) mechanism to incentivize peers to participate in content sharing in a secure and effective way may be provided. In one embodiment, the PoD may detect and isolate a fraud in a trustless network. Moreover, the PoD may enhance the delivery performance of a trustworthy peer by implementing trust window. As a result, a trustworthy peer will receive incentives in terms of performance, while a fraud will be punished. The simulation results show that the PoD can detect and isolate a fraud effectively. We plan to apply the PoD to commercial content delivery services.

As will be appreciated by those skilled in the art, the present invention is not limited to the examples described in the present disclosure, but can be variously modified, reconstructed, and replaced without departing from the scope of the present disclosure. It should be understood that the various techniques described herein can be implemented by hardware or software, or a combination of hardware and software.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein. In addition, the various technical features in the present inventive concept may be implemented by hardware, software, or a combination of hardware and software. Accordingly, a specific part of the method of analyzing the hazard of the control software driving system may be formed as at least one of computer programs executable by a general-purpose microprocessor, a dedicated microprocessor and a microcontroller. The computer program according to the present exemplary embodiments may be stored in one of storing mediums including a non-volatile memory such as EPROM, EEPROM and a flash memory device, an internal hard disk and a detachable disk, a magnetic disk, a magnetooptic disk and a CD disk. In addition, the program codes may be written in an assembly language or a machine language. The program codes may be transmitted by one of transmitting mediums including an electric wiring, a cable, and an optical fiber and so on.

What is claimed is:

1. A method performed in a transmitting terminal for delivering content in a peer-to-peer (P2P) network, the method comprising:
   receiving, by the transmitting terminal, a delivery request of a k-th chunk of the content from a requesting terminal;
   in response to receiving the delivery request, calculating a delivery probability of delivering the k-th chunk of the content to the requesting terminal; and delivering the k-th chunk of the content to the requesting terminal based on the delivery probability, wherein:

the calculating the delivery probability of delivering the k-th chunk of the content to the requesting terminal comprises:

receiving a blockchain transaction record of a blockchain network, and calculating the delivery probability based on transaction information of the requesting terminal included in the blockchain transaction record, wherein the delivery probability of delivering the k-th chunk of the content is calculated based on a chunk request probability ($P_\alpha^{i,j}$ or $P_\alpha$) for the k-th chunk, wherein the content is composed of N+1 chunks, and wherein i is an index of a smallest chunk that has not been transmitted and rewarded for an i-th chunk, j is an index of a next chunk requested by the requesting terminal, N is a largest chunk index of the content, and $\alpha$ is an arbitrary value of $0<\alpha<1$.

2. The method of claim 1 further comprising:

in response to receiving the delivery request of the k-th chunk, calculating trustworthiness of the requesting terminal;

adjusting a size (L) of a trust window of the requesting terminal in proportion to the reliability of the requesting terminal;

receiving a delivery request for a k+1th chunk of the content or a delivery request for a k+L−1th chunk of the content from the requesting terminal; and in response to receiving the delivery request for the k+1th chunk of the content or the delivery request for the k+L−1th chunk of the content, delivering the k+1-th chunk of the content or delivering the k+L−1th chunk of the content to the requesting terminal, wherein L is a positive number; and wherein the calculating the trustworthiness of the requesting terminal comprises:

calculating the size of the trust window of the requesting terminal, wherein the size of the trust window of the requesting terminal is increasing proportionally to a value that is the number of chunks received by the requesting terminal minus the number of the chunks for which the requesting terminal has not paid.

3. The method of claim 1, wherein the transaction information includes transmitting terminal information, receiving terminal information, transaction amount information, and transaction content information.

* * * * *